US012625792B2

(12) United States Patent
Zhu et al.

(10) Patent No.: US 12,625,792 B2
(45) Date of Patent: May 12, 2026

(54) SYSTEMS AND METHODS FOR UTILIZING EMBEDDED THERMAL SENSORS OF INFORMATION HANDLING RESOURCE TO MONITOR THERMAL CHANGE ON CIRCUIT BOARD

(71) Applicant: Dell Products L.P., Round Rock, TX (US)

(72) Inventors: Guangyong Zhu, Austin, TX (US); Jonathon Hughes, Round Rock, TX (US); Feng Cheng Su, Gu Tao Yuan (TW)

(73) Assignee: Dell Products L.P., Round Rock, TX (US)

( * ) Notice: Subject to any disclaimer, the term of this patent is extended or adjusted under 35 U.S.C. 154(b) by 44 days.

(21) Appl. No.: 18/590,635

(22) Filed: Feb. 28, 2024

(65) Prior Publication Data

US 2025/0272208 A1     Aug. 28, 2025

(51) Int. Cl.
*G06F 11/30*          (2006.01)
*G06F 1/20*          (2006.01)

(52) U.S. Cl.
CPC .......... *G06F 11/3062* (2013.01); *G06F 1/206* (2013.01)

(58) Field of Classification Search
None
See application file for complete search history.

(56) References Cited

U.S. PATENT DOCUMENTS

| | | | | |
|---|---|---|---|---|
| 10,188,015 B2 * | 1/2019 | Saeidi | .................... | G01K 7/183 |
| 2009/0014433 A1 * | 1/2009 | O'Neil | .................... | G06F 1/206 219/491 |
| 2011/0301777 A1 * | 12/2011 | Cox | ..................... | G06F 1/3203 713/300 |

* cited by examiner

*Primary Examiner* — Kim Huynh
(74) *Attorney, Agent, or Firm* — Jackson Walker L.L.P.

(57)          ABSTRACT
An information handling system may include an information handling resource comprising an embedded temperature sensor and a thermal monitoring system configured to receive temperature information from the embedded temperature sensor, receive operational state information for the information handling system, and based on the temperature information and the operational state information, determine if an undesired heating event is present within the information handling resource.

15 Claims, 2 Drawing Sheets

200

START

202 — THERMAL MONITORING SYSTEM 114 RECEIVES FROM TEMPERATURE SENSOR 118 TEMPERATURE SIGNAL INDICATIVE OF TEMPERATURE ASSOCIATED WITH INFORMATION HANDLING RESOURCE 116

204 — THERMAL MONITORING SYSTEM 114 RECEIVES INFORMATION REGARDING OPERATIONAL STATE OF INFORMATION HANDLING SYSTEM 102 AND/OR ONE OR MORE OF IT VARIOUS COMPONENTS

UNDESIRABLE HEATING EVENT PRESENT AT INFORMATION HANDLING RESOURCE 116?     NO

206

YES

208 — THERMAL MONITORING SYSTEM 114 TAKES REMEDIAL ACTION TO ADDRESS PRESENCE OF UNDESIRABLE HEATING EVENT

SYSTEMS AND METHODS FOR UTILIZING EMBEDDED THERMAL SENSORS OF INFORMATION HANDLING RESOURCE TO MONITOR THERMAL CHANGE ON CIRCUIT BOARD

TECHNICAL FIELD

The present disclosure relates in general to information handling systems, and more particularly to utilizing embedded thermal sensors of an information handling resource to monitor thermal change on a circuit board.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may often use one or more circuit boards. A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

In designing circuit boards, an increasing challenge is the electrical current density on layers of the motherboard delivering more power and higher current to processors and other systems loads (e.g., memories, etc.) over limited circuit board space. Due to non-uniform dielectric thickness between PCB layers, the conductive anodic filament between power and ground layers may form and present as a resistive load on a power rail. Other factors or events may also cause an undesirable resistive load on a power rail.

Such resistive loading could gradually heat up the circuit board even under light processor and system loading conditions, and could bring about an exothermic event by shorting the power rail to ground.

Accordingly, systems and methods for detecting unexpected heating in a circuit board may be desirable.

SUMMARY

In accordance with the teachings of the present disclosure, the disadvantages and problems associated with undesirable heating of circuit boards may be substantially reduced or eliminated.

In accordance with embodiments of the present disclosure, an information handling system may include an information handling resource comprising an embedded temperature sensor and a thermal monitoring system configured to receive temperature information from the embedded temperature sensor, receive operational state information for the information handling system, and based on the temperature information and the operational state information, determine if an undesired heating event is present within the information handling resource.

In accordance with these and other embodiments of the present disclosure, a method may include receiving temperature information from an embedded temperature sensor integral to an information handling resource of an information handling system, receiving operational state information for the information handling system, and based on the temperature information and the operational state information, determining if an undesired heating event is present within the information handling resource.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to: receive temperature information from an embedded temperature sensor integral to an information handling resource of an information handling system; receive operational state information for the information handling system; and based on the temperature information and the operational state information, determine if an undesired heating event is present within the information handling resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
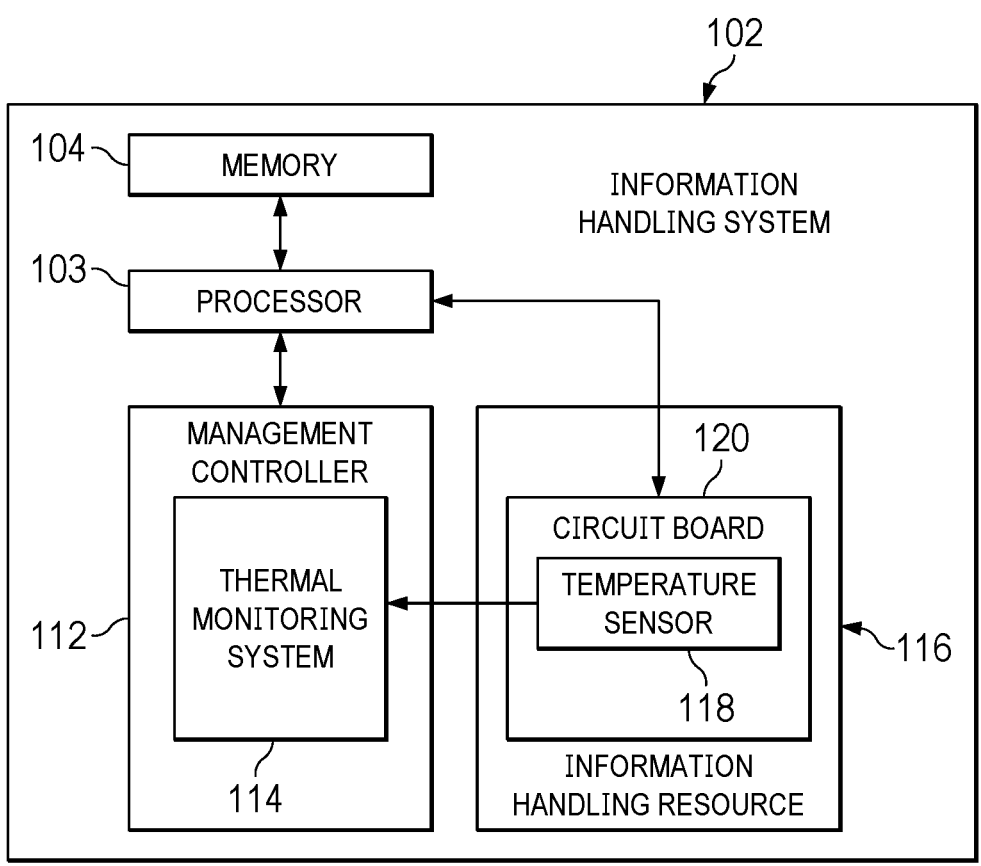
FIG. 1 illustrates a block diagram of an example information handling system, in accordance with embodiments of the present disclosure.
Figure 2:
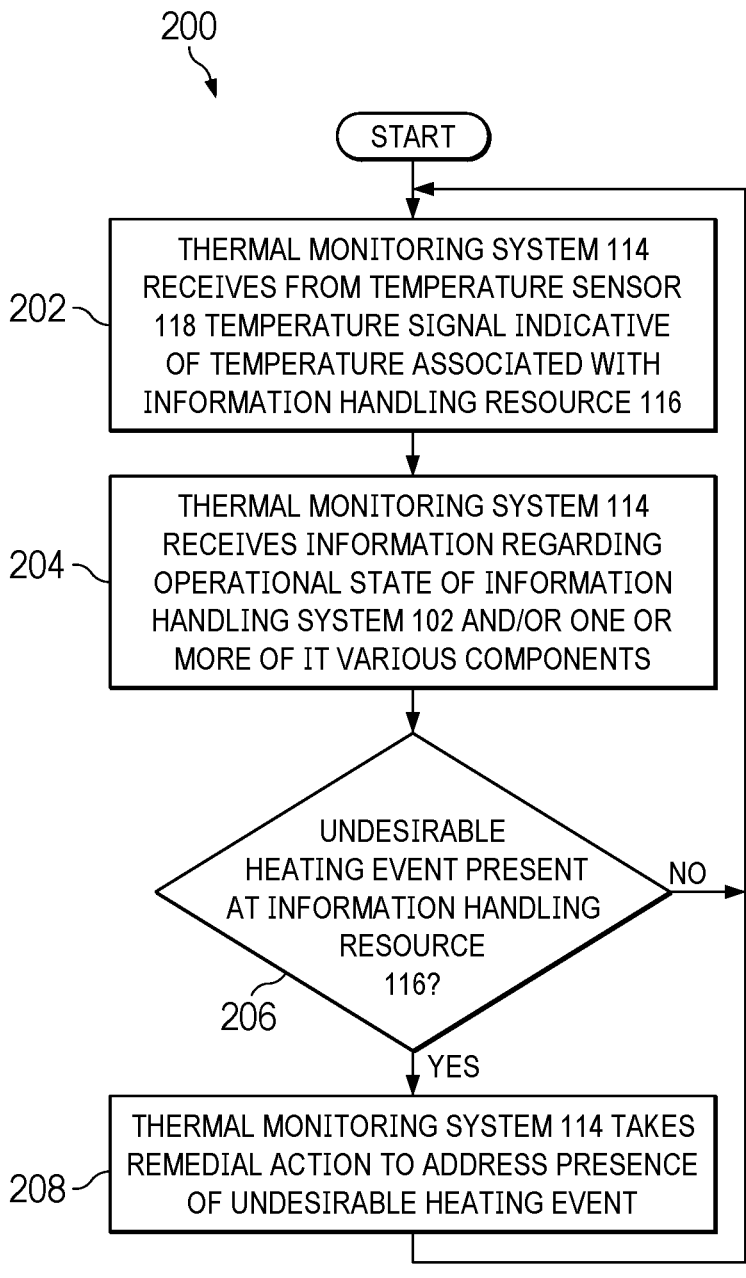
FIG. 2 illustrates a flow chart of an example method for monitoring for an unexpected heating event within an information handling resource, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs), etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, information handling system 102 may comprise a processor 103, a memory 104, a management controller 112, and an information handling resource 116.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Management controller 112 may comprise any system, device, or apparatus configured to facilitate management and/or control of information handling system 102 and/or one or more of its component information handling resources. Management controller 112 may be configured to issue commands and/or other signals to manage and/or control information handling system 102 and/or its information handling resources. Management controller 112 may comprise a microprocessor, microcontroller, DSP, ASIC, field programmable gate array ("FPGA"), EEPROM, or any combination thereof. Management controller 112 also may be configured to provide out-of-band management facilities for management of information handling system 102. Such management may be made by management controller 112 even if information handling system 102 is powered off or powered to a standby state. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

As shown in FIG. 1, management controller 112 may include a thermal monitoring system 114. Thermal monitoring system 114 may include any system, device, or apparatus configured to receive one or more signals indicative one or more temperatures within information handling system 102 (e.g., one or more signals from temperature sensor 118 integral to information handling resource 116), and based on such signals, in combination with other information regarding an operational state of information handling system 102 (e.g., loading conditions on processor 103, memory 104, information handling resource 116; ambient temperature; fan speeds of cooling fans, etc.), determine if an unexpected increase in a temperature of a circuit board 120 or an information handling resource 116 has occurred, potentially indicating the presence of undesirable resistive loading between power and ground rails of circuit board 120 or another potential unexpected heating event. In some embodiments, thermal monitoring system 114 may include a program of instructions (e.g., software, firmware) embodied in computer-readable media and configured to, when executed by a processor or controller integral to management controller 112, carry out the functionality of thermal monitoring system 114.

Information handling resource 116 may include any component system, device or apparatus of information handling system 102, including without limitation a processor, bus, computer-readable medium, input-output device and/or interface, storage resource, network interface, motherboard, electro-mechanical device (e.g., fan), display, and/or power supply (e.g., voltage regulator). As shown in FIG. 1, information handling resource 116 may be implemented at least in part with a circuit board 120 having a temperature sensor 118 embedded therein for sensing a temperature associated with information handling resource 116.

Temperature sensor 118 may be any system, device, or apparatus (e.g., a thermometer, thermistor, etc.) configured to communicate a signal to thermal monitoring system 114 indicative of a temperature within or proximate to information handling resource 116. For example, temperature sensor 118 may primarily be configured to sense temperature as part of a feedback thermal control system of information handling system 102 that regulates speed for cooling fans based on sensed temperatures throughout information handling system 102. As another example, temperature sensor 118 may be an integral part of a power stage used in a voltage regulator used to power components (e.g., processor 103) of information handling system 102. Such a voltage regulator may include two to ten power stages, and information handling system 102 may comprise a plurality of voltage regulators.

Accordingly, thermal monitoring system 114 may leverage temperature sensors 118 intended for other functionality in order to monitor for unexpected heating events, such as those that may be caused by undesired resistive loads between power and ground of printed circuit board 120, thus minimizing additional hardware and cost needed to implement monitoring by thermal monitoring system 114.

In addition to processor 103, memory 104, management controller 112, and information handling resource 116, information handling system 102 may include one or more other information handling resources. In addition, for the sake of clarity and exposition of the present disclosure, FIG. 1 depicts only one information handling resource 116. In embodiments of the present disclosure, information handling system 102 may include any number of information handling resource 116.

FIG. 2 illustrates a flow chart of an example method 200 for monitoring for an undesirable heating event within information handling resource 116, in accordance with embodiments of the present disclosure. According to one embodiment, method 200 may begin at step 202. As noted above, teachings of the present disclosure may be implemented in a variety of configurations of information handling system 102 and/or thermal monitoring system 114. As such, the preferred initialization point for method 200 and the order of the steps comprising method 200 may depend on the implementation chosen.

At step 202, thermal monitoring system 114 may receive from temperature sensor 118 a temperature signal indicative of a temperature associated with information handling resource 116.

At step 204, thermal monitoring system 114 may receive information regarding an operational state of information handling system 102 and/or one or more of its various components. For example, in some embodiments, such operational state information may include loading (i.e., processing) conditions on one or more of processor 103, memory 104, information handling resource 116, and another component of information handling system 102. Such loading conditions may be those that might be expected to affect a temperature sensed by temperature sensor 118 in the absence of an undesirable heating event at information handling resource 116. As an additional example, in these and other embodiments, such operational state information may include power consumption information regarding an amount of power drawn from power supplies of information handling system 102. A high power draw may be a condition that may cause a high temperature sensed by temperature sensor 118 in the absence of an undesirable heating event at information handling resource 116. As another example, in these and other embodiments, such operational state information may include an ambient temperature of information handling system 102 (e.g., as sensed by a temperature sensor other than temperature sensor 118). Higher ambient temperatures may present conditions in which temperature sensor 118 may report high temperatures in the absence of an undesirable heating event at information handling resource 116. As a further example, in these and other embodiments, such operational state information may include speeds of cooling fans for cooling information handling system 102 and its components. Lower fan speeds may present conditions in which temperature sensor 118 may report high temperatures in the absence of an undesirable heating event at information handling resource 116.

At step 206, based on the temperature signal and the operational state information, thermal monitoring system 114 may determine if an undesirable heating event is present at information handling resource 116. In some embodiments, thermal monitoring system 114 may make such determination simply based on Boolean comparisons, such as determining that an undesirable heating event is present at information handling resource 116 if the temperature signal (or a change in the temperature signal over a predefined period of time) is above a threshold temperature (or temperature change) and the operational state information indicates low temperature conditions should be present at temperature sensor 118. Such low temperature conditions may include component loading conditions being below a threshold loading level, power consumption being below a threshold power level, the ambient temperature being below a threshold ambient level, and the fan speed of cooling fans being within a particular fan speed range. In other embodiments, thermal monitoring system 114 may make such determination by a more computationally extensive approach, such as an algebraic equation that considers the temperature signal and one or more of loading conditions, power consumption, ambient temperature, and fan speed. If no undesirable heating event is determined to be present, method 200 may proceed again to step 202. Otherwise, method 200 may proceed to step 208.

At step 208, thermal monitoring system 114 may take a remedial action to address the presence of the undesirable heating event. Such a remedial action may include, but is not limited to, communicating an alert to a user or administrator of information handling system 102, disabling the information handling resource 116 experiencing the undesirable heating event, and powering off information handling system 102. At conclusion of step 208, method 200 may proceed again to step 202 (although in some embodiments, method 200 may end after step 208).

Although FIG. 2 discloses a particular number of steps to be taken with respect to method 200, method 200 may be executed with greater or lesser steps than those depicted in

7

FIG. 2. In addition, although FIG. 2 discloses a certain order of steps to be taken with respect to method 200, the steps comprising method 200 may be completed in any suitable order.

Method 200 may be implemented using information handling system 102, thermal monitoring system 114, or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
an information handling resource comprising an embedded temperature sensor, wherein the embedded temperature sensor configured to measure temperature information of the information handling resource; and
a thermal monitoring system configured to:
receive the measured temperature information from the embedded temperature sensor;
receive operational state information for the information handling system; wherein the operational state information comprises information regarding an ambient temperature of the information handling system, wherein the ambient temperature is measured by a sensor other than the embedded temperature sensor;
based on the measured temperature information and the operational state information, detect an undesired heating event is present within the information handling resource; wherein the undesired heating event comprises unintended resistive loading between layers of a circuit board integral to the information handling system, wherein the embedded temperature sensor is integral to the circuit board; and
take remedial action in response to detecting the undesired heating event is present.

2. The information handling system of claim 1, wherein the embedded temperature sensor is part of a feedback temperature control system for cooling components of the information handling system.

3. The information handling system of claim 1, wherein the operational state information comprises information regarding loading conditions on one or more components of the information handling system.

4. The information handling system of claim 1, wherein the operational state information comprises information regarding power consumption of the information handling system.

5. The information handling system of claim 1, wherein the operational state information comprises information regarding a fan speed of one or more cooling fans of the information handling system.

6. A method comprising:
measuring temperature information of an information handling resource by an embedded temperature sensor
receiving the measured temperature information from the embedded temperature sensor;
receiving operational state information for the information handling system; wherein the operational state information comprises information regarding an ambient temperature of the information handling system, wherein the ambient temperature is measured by a sensor other than the embedded temperature sensor;
based on the measured temperature information and the operational state information, detecting an undesired heating event is present within the information handling resource, wherein the undesired heating event comprises unintended resistive loading between layers of a circuit board integral to the information handling system, wherein the embedded temperature sensor is integral to the circuit board; and taking remedial action in response to detecting the undesired heating event is present.

7. The method of claim 6, wherein the embedded temperature sensor is part of a feedback temperature control system for cooling components of the information handling system.

8. The method of claim 6, wherein the operational state information comprises information regarding loading conditions on one or more components of the information handling system.

9. The method of claim 6, wherein the operational state information comprises information regarding power consumption of the information handling system.

10. The method of claim 6, wherein the operational state information comprises information regarding a fan speed of one or more cooling fans of the information handling system.

11. An article of manufacture comprising:

a non-transitory computer-readable medium; and computer-executable instructions carried on the computer-readable medium, the instructions readable by a processor, the instructions, when read and executed, for causing the processor to:

receive measured temperature information from an embedded temperature sensor, where in the embedded temperature sensor measures the temperature information of the information handling resource;

receive operational state information for the information handling system, wherein the operational state information comprises information regarding an ambient temperature of the information handling system, wherein the ambient temperature is measured by a sensor other than the embedded temperature sensor;

based on the measured temperature information and the operational state information, detect an undesired heating event is present within the information handling resource; wherein the undesired heating event comprises unintended resistive loading between layers of a circuit board integral to the information handling system, wherein the embedded temperature sensor is integral to the circuit board; and take remedial action in response to detecting detecting the undesired heating event is present.

12. The article of claim 11, wherein the embedded temperature sensor is part of a feedback temperature control system for cooling components of the information handling system.

13. The article of claim 11, wherein the operational state information comprises information regarding loading conditions on one or more components of the information handling system.

14. The article of claim 11, wherein the operational state information comprises information regarding power consumption of the information handling system.

15. The article of claim 11, wherein the operational state information comprises information regarding a fan speed of one or more cooling fans of the information handling system.

* * * * *